United States Patent
Yoshida et al.

(10) Patent No.: US 9,062,965 B2
(45) Date of Patent: Jun. 23, 2015

(54) MULTI-POINT MEASURING APPARATUS AND METHOD OF FBG SENSOR HAVING MULTIPLE DELAYING FIBERS

(71) Applicant: Hitachi, Ltd., Chiyoda-ku, Tokyo (JP)

(72) Inventors: Minoru Yoshida, Yokohama (JP); Masahiro Watanabe, Yokohama (JP); Tatsuo Hariyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 309 days.

(21) Appl. No.: 13/655,998

(22) Filed: Oct. 19, 2012

(65) Prior Publication Data

US 2013/0140445 A1    Jun. 6, 2013

(30) Foreign Application Priority Data

Dec. 1, 2011   (JP) ................ 2011-263252

(51) Int. Cl.
    *G01B 11/16*    (2006.01)
    *G01D 5/353*    (2006.01)

(52) U.S. Cl.
    CPC .......... *G01B 11/165* (2013.01); *G01D 5/35303* (2013.01); *G01D 5/35316* (2013.01); *G01D 5/35387* (2013.01)

(58) Field of Classification Search
    USPC ............ 250/227.11, 227.14, 227.16, 227.18, 250/227.23; 385/37, 10, 24, 39
    See application file for complete search history.

(56) References Cited

U.S. PATENT DOCUMENTS

2011/0098533 A1*  4/2011  Onoda et al. .................. 600/117
2011/0139447 A1*  6/2011  Ramos et al. .............. 166/254.2

FOREIGN PATENT DOCUMENTS

| JP | 10-141922 A | 5/1998 |
| JP | 2001-159723 A | 6/2001 |
| JP | 2003-123178 A | 4/2003 |
| JP | 2005-315635 A | 11/2005 |

* cited by examiner

*Primary Examiner* — Francis M Legasse, Jr.
(74) *Attorney, Agent, or Firm* — Crowell & Moring LLP

(57) ABSTRACT

A multi-point measuring apparatus of FBG sensor has an optical fiber, a wide-band wavelength light source, a light-source side light modulator for controlling time of a light entering into the optical fiber, among lights from this light source, a detector side light modulator for controlling time, during which a reflection light from a diffraction grating of the optical fiber penetrates through, a wavelength shift amount calculator for processing a signal obtained through detection of the reflection light from this light modulator, a temperature/distortion calculator for calculating an amount of deformation of a target to be measured from a result of this calculator, and a display portion for displaying information relating to the amount of deformation of this target to be measured.

5 Claims, 11 Drawing Sheets $T1 = (\lambda_B' - \lambda_B)/10 \text{pm}/°C$    $T2 = (\lambda_G' - \lambda_G)/10 \text{pm}/°C$ FIG. 4
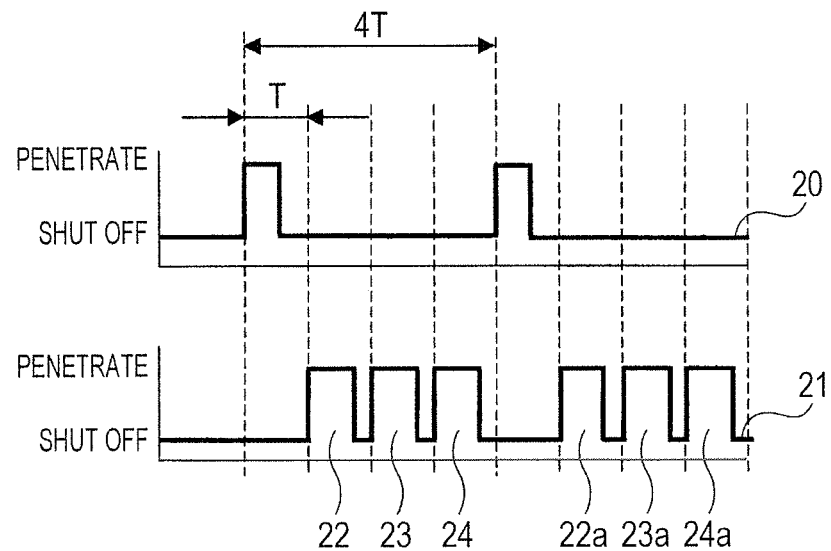
FIG. 5A
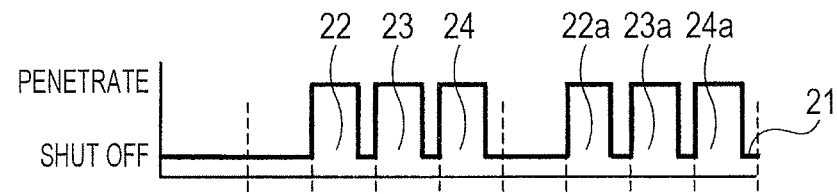
FIG. 5B
FIG. 5C
FIG. 5D
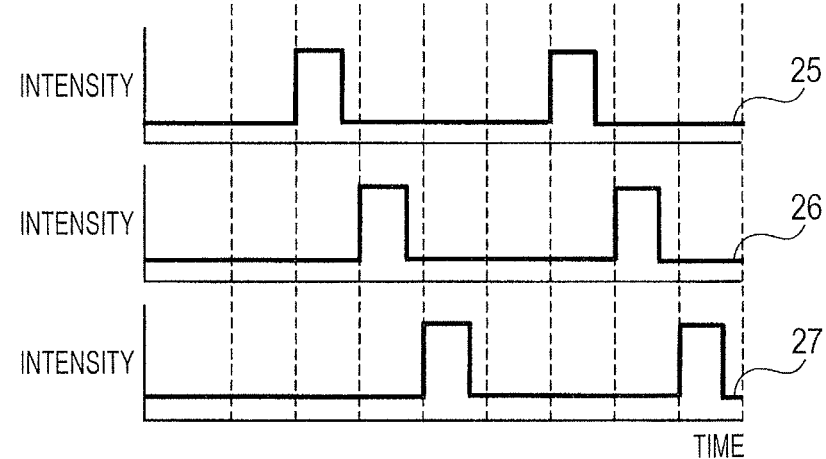

$\lambda_A$: REFLECTION WAVELENGTH OF FBG
$N_{eff}$: AVERAGED EFFECTIVE REFRACTIVE INDEX
$\Lambda$: GRATING PERIOD $\lambda_A = N_{eff} \Lambda$

MULTI-POINT MEASURING APPARATUS AND METHOD OF FBG SENSOR HAVING MULTIPLE DELAYING FIBERS

This application relates to and claims priority from Japanese Patent Application No. 2011-263252 filed on Dec. 1, 2011, the entire disclosure of which is incorporated herein by reference.

BACKGROUND OF THE INVENTION

The present invention relates to a multi-point measuring technology of a FBG sensor, and in particular, it relates to a multi-point measuring method of the FBG sensor for detecting deformation of a target to be measured and a multi-point measuring apparatus. In more details thereof, it relates to the multi-point measuring method of the FBG sensor and the apparatus for enabling detection without exchanging a fiber optical path, with providing plural pieces of optical fibers, being inserted plural numbers of FBG sensors in series, each of which changes a wavelength of a reflection light, and multiplexing them time-divisionally.

In recent years, as a means for measuring temperature or distortion of a target with using optical fibers is proposed a FBG sensor method, with using a Fiber Bragg Grating (hereinafter, being described "FBG") therein. The FBG sensor forms diffraction gratings, repetitively, with a portion having a high refractive index and a portion having a low refractive index at a constant distance within a core of the optical fiber.

Explanation will be made on a principle of the general FBG sensor, by referring to FIGS. 13A to 13D attached herewith. FIG. 13A shows distribution of wavelength of an optical signal, which is inputted to the FBG sensor, and FIG. 13B shows a cross-section view of the FBG sensor, respectively. FIG. 13C shows distribution of the optical signal, which is reflected and outputted by the FBG sensor, among inputs inputted, and FIG. 13D shows distribution of wavelength of an optical signal, which passes through the FBG sensor, among the inputs inputted, respectively. An optical fiber 500 is constructed with a core 501, i.e., a fine material made of quarts glass, being disposed at a center, and a clad 502 covering over the periphery thereof. Since the quarts glass is brittle, it is covered by a protection film 503 on the periphery thereof. On the core 501 is formed a periodic diffraction grating 505 at a pitch "Λ" within a range of length "L". This diffraction grating 505 can be formed through irradiating an interference pattern of ultraviolet light (of a wavelength of around 250 nm, for example,) upon the core 501 of the optical fiber, thereby changing the refractive index of the core 501, periodically. A part, on which this diffraction grating 505 is formed, is called the FBG sensor 5.

The wavelength of a reflection light 507 of the FBG sensor 5 results to change depending on a physical quantity, which changes the refractive index of the core 501 or the period of the diffraction grating 505. For example, if thermal change is caused in the FBG sensor 5, since a fluctuation of the refractive index is generated due to the thermal change of the core 501, and the period of the diffraction grating 505 is varied, then the wavelength of the reflection light 507 is shifted. An amount of the shift due to this temperature comes to be about 10 pm/° C., when applying a wavelength band of 1.5 µm. Also, distortion generated in the FBG sensor 5 brings about generation of expansion and contraction in the core 501, then the diffraction grating 505 changes the period or frequency thereof. The shift amount due to this distortion comes to about 1.2 pm/µε.

A method is described in the following Patent Document 1, for example, wherein the FBG sensor is applied as a multi-point distortion and temperature sensor. In this method, plural numbers of FBG sensors, each changing the wavelength of the reflection light, are inserted within an optical fiber, in series, wherein an optical signal is entered from an end of this optical fiber to measure an amount of the reflection light by an OTDR (Optical Time Domain Reflectometer), and also to measure back scattering light from an inside of the optical fiber by the OTDR, and thereby obtaining distribution of temperature along the longitudinal direction of the optical fiber. And then, upon basis of this distribution of temperature, correction is made on an amount of change of the reflection light depending on the temperature of each FBG sensor, and from this corrected mount of the reflection light is obtained an exact distortion of each FBG sensor, in the method thereof. Thus, the OTDR is that for measuring a condition and a place of loss within the optical fiber, by measuring a position and an intensity of the back scattering light while entering an optical pulse into the optical fiber. The distance revolving power of thereof is, in general, about several ten centimeters. In case where plural numbers of pieces of the optical fibers are applied, the measurement can be made by one (1) set of a measuring instrument with exchanging them by using an exchanging switch therein. Further, it is said that the number of pieces of the optical fibers can be increased depending on a capacity of the exchanging switch.

Also, a method for providing plural numbers of the FBG sensors in a rotating body is described in the following Patent Document 2, for example. In this method, the optical signals of the FBG sensors, which are provided in the rotating body, are transmitted to a receiving portion, which is provided outside, in a non-contact or contactless manner. In case where an optical axis, through which an optical transmission is conducted, lies at the center of rotation, the transmission can be made with using only one (1) piece of a transmission path, and then, where the plural numbers of the FBG sensors are provided within the rotating body, it is mentioned, the optical fibers are exchanged with using the exchanging optical switches, so as to deal with that.

PRIOR ART DOCUMENTS

Patent Documents

[Patent Document 1] Japanese Patent Laying-Open No. Hei 10-141922 (1998); and
[Patent Document 2] Japanese Patent Laying-Open No. 2003-123178 (2003).

BRIEF SUMMARY OF THE INVENTION

However, with the measuring method as was described in the Patent Document 1 mentioned above, since being the OTDR method, the distance resolution power thereof is bad or low, such as, about several tens centimeters, and since measurement cannot be made in a place in the vicinity thereof, then the measurement cannot be at a specific place. Also, when measuring with using plural pieces of the optical fibers, since there is a necessity of exchanging them with using the optical switches, then it is impossible to make the measurement at plural numbers of places, at the same time. If trying to make the measurement at plural numbers of places at the same time, in accordance with this method, the numbers of the measuring instruments, being same to that of the optical fibers, are necessary; then, the apparatus comes to be large-scaled, and also there is a necessity of cooperation of those measuring instruments. Also, with using the plural numbers of measuring instruments, there can be considered a possibility of lowering the reliability thereof, such as, each measuring instrument has a sensitivity different from.

Also, with the measuring method described in the Patent Document 2 mentioned above, since a rotating system and a fixing system are separated from each other, there can be obtained the connection with using the optical fiber. For this reason, a transmission path for connection between the rotating system and the fixing system must be one (1) system, and therefore it is impossible to connect the plural pieces of the optical fibers. With the method described in this Patent Document 2, as the means in the case of using the plural pieces of the optical fibers, there is provided the optical switches on a side of the rotating system, to exchange the optical switch depending on the measuring place, so as to deal with.

Also, though there is no description in the Patent Documents 1 and 2 mentioned above, as a method for connecting plural numbers of the optical fibers can be applied an optical fiber coupler. However, since the optical fiber coupler has only a function of simply distributing one (1) piece to plural numbers of pieces thereof, then if connecting plural pieces of the optical fibers, each having the FBG sensor being formed with the same reflection wavelength, for example, on a detector is detected the wavelength of that piling up the plural pieces of the waves. For this reason, it is impossible to separate a specific optical fiber, i.e., impossible to make an exact measurement.

Then, with applying the FBG sensors of plural pieces of the optical fibers, changing the wavelengths of reflection lights, it is possible to avoid overlapping of the wavelengths. However, on the detector side is detected all of the wavelengths of the reflection lights, and the wavelengths are composed. For this reason, under the condition of no change of the FBG sensors, it is possible to specify the wavelength of each optical fiber; however, in case where temperature or distortion is generated in the FBG sensor, only the wavelength of that portion is changed, then it piles up on the wavelength of the FBG sensor, which is not changed, or overtakes that wavelength; thereby it is impossible to capture the correct change of wavelength.

Then, according to the present invention, being accomplished by taking the drawbacks mentioned above into the consideration thereof, a representative object thereof is to provide a multi-pint measuring method and an apparatus of FBF sensor, enabling to measure the FBG sensors of plural pieces of optical fibers, without using an optical switch therein, even under the condition of applying the plural pieces of the optical fibers in one (1) piece of a transmission path.

The objects, including that mentioned above and others than that, and also the novel features thereof will be apparent from the description and drawings attached therewith of the present specification.

Brief explanation of one of the invention disclosed in the present application, representatively, is as follows.

Thus, a representative multi-point measuring method of FBG sensor, having a first optical fiber, forming a diffraction grating on a first core and comprising a first delaying fiber having a first delay time, and a second optical fiber forming a diffraction grating on a second core and comprising a second delaying fiber having a second delay time, comprises the following steps of: modulating a light from a light source within a first light modulator; entering the light, which is modulated within said first light modulator, into said first optical fiber and said second optical fiber; modulating reflection lights from the diffraction grating of said first optical fiber and the diffraction grating of said second optical fiber within a second light modulator; conducting photoelectric conversion on the reflection lights, which are modulated within said second light modulator within a photoelectric converter element; and calculating a wavelength from the signal, which is obtained through the photoelectric conversion by said photoelectric converter element, and separating the signal from said first optical fiber from the signal from said second optical fiber, in a time-sequential manner, thereby to measure deformation of a target to be measured.

Also, as a representative multi-point measuring apparatus of FBG sensor, comprises: an optical fiber, which forms a diffraction grating on a first core; a light source, which is configured to emit lights; a first light modulator, which is configured to control time of a light entering into said optical fiber, among the lights being emitted from said light source; a second light modulator, which is configured to enter a light emitting from said first light modulator into said optical fiber, so as to control time during which a reflection light from the diffraction grating of said optical fiber penetrates through; a wavelength shift amount calculator, which is configured to separate a signal from said optical fiber through processing a signal, being obtained by detecting the reflection light from said second light modulator; a calculator, which is configured to calculate an amount of deformation of a target to be measured, from a result of said wavelength shift amount calculator; and a display portion, which is configured to display information relating to the amount of deformation of said target to be measured, being calculated by said calculator.

Brief explanation of an effect, which is obtained by the representative one of the present inventions disclosed in the present application, is as follows.

Thus, as the representative effect is to transmit optical signals from the plural pieces of the optical fibers, without exchanging them with using an optical switch, by means of one (1) piece of a transmission path, and further to detect the plural pieces of the optical fibers by means of one (1) set of a measuring instrument.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 4 is a view for explaining an example of operation timings of light modulators (a light modulator on a light-source side and a light modulator on a detector side);

FIGS. 5A to 5D are views for showing an example of distribution of detection strength, for each of optical fiber in a light receiving element, which is detected at the timing shown in FIG. 4;

DETAILED DESCRIPTION OF THE PREFERRED EMBODIMENTS

Figure 1:
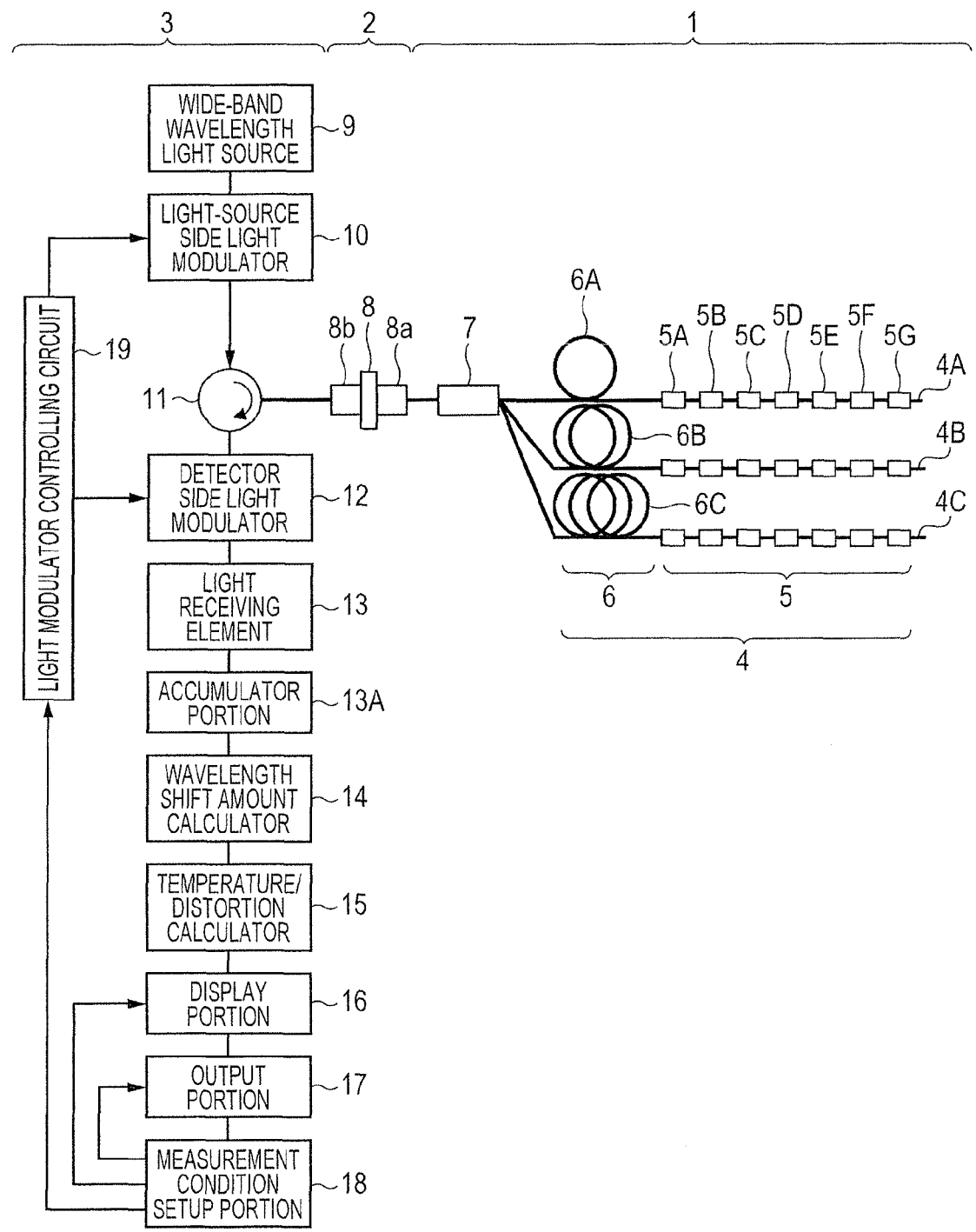
FIG. 1 is a view for showing an example of the structures of a multi-point measuring apparatus of FBG sensor, according to an embodiment of the present invention.

In the following embodiments, which will be mentioned hereinafter, although explanation will be made, separating them into the plural numbers of embodiments or sections thereof, if there is such a necessity, for the convenience thereof, but excepting for the cases where a clear mentioning is made thereof, in particular, those are related with each other, in a relationship, such as, one is an example of a variation, details, supplemental explanation, etc., of a part or all of the other. Also, in the following embodiments, which will be mentioned hereinafter, when mentioning a number, etc. (including a number of pieces, a numerical value, an amount, a range, etc.) of element (s), excepting for the cases where a clear mentioning is made thereof and it should be restricted clearly to a specific number, theoretically, it should not be limited to that specific number, but may be greater or less than the specific number.

Further, in the following embodiments, which will be mentioned hereinafter, it is needless to say that the constituent element(s) (including a step element(s), etc.) is/are necessarily essential to the present invention, except for the cases where a clear mentioning is made thereof, in particular, and where it/they are clearly considered to be essential. In the similar manner, in the following embodiments, which will be mentioned hereinafter, it/they should include those, being approximate or similar thereto, substantially, in the configuration thereof, etc., when mentioning is made on the configuration, a positional relationship, etc., of the constituent element (s), but except for the cases where a clear mentioning is made thereof, in particular, and where it should be considered not to be so, theoretically.

<Brief Explanation of Embodiments According to Present Invention>

A multi-point measuring method of FBG sensor (a reference numeral or the like of a constituent element will be added within ( ), as an example), according to the present embodiment, having a first optical fiber (for example, 4A), forming a diffraction grating on a first core and comprising a first delaying fiber having a first delay time, and a second optical fiber forming a diffraction grating on a second core and comprising a second delaying fiber (for example, 4B) having a second delay time, comprises the following steps of: modulating a light from a light source within a first light modulator (S1204); entering the light, which is modulated within said first light modulator, into said first optical fiber and said second optical fiber; modulating reflection lights from the diffraction grating of said first optical fiber and the diffraction grating of said second optical fiber within a second light modulator (S1205); conducting photoelectric conversion on the reflection lights, which are modulated within said second light modulator within a photoelectric converter element; and calculating a wavelength from the signal, which is obtained through the photoelectric conversion by said photoelectric converter element (S1207 to S1209), and separating the signal from said first optical fiber from the signal from said second optical fiber, in a time-sequential manner, thereby to measure deformation of a target to be measured (S1210).

In more details thereof, within the multi-point measuring method of FBG sensor, on one (1) piece of an optical fiber are formed the FBG sensors, being connected one by one, in series, and each differs a little bit from the others) in the wavelengths of the reflection light. And, this optical fiber is provided by a plural number of pieces thereof, each being different from the other(s), in the length from the measuring instrument to the FBG sensors. Those plural pieces of optical fibers are coupled or composed by an optical coupler, so as to obtain one (1) piece of output therefrom. Thus, the lights from the light source are light-modulated, by means of the light modulator on the light-source side, so that a light, being controlled on specific timing and time thereof, is emitted from. The light emitting therefrom is distributed to each of the optical fibers through the optical fiber coupler, so that it is reflected on the FBG sensor of each optical fiber. The reflection light on each optical fiber is composed, again, through the optical fiber couple, so as to be guided to the detector side through an optical circulator. And, the guided light is received, within the light modulator on the light-source side, on a light receiving element of the detector, depending on the timing and the time in synchronism with the timing and the time of the light modulator on the light-source side. The light received thereon is converted into an electric signal so that a wavelength can be outputted corresponding to each FBG sensor. The wavelength outputted therefrom is determined to be the reflection light from a specific optical fiber, depending on the timings of the light modulator on the light-source side and the light modulator on the detector side, and depending on an amount of movement of the wavelength, the temperature or the amount of the distortion is calculated. The temperature or the amount of the distortion calculated is processed for each optical fiber, so that information can be displayed relating to the change(s) of the target to be measured.

Also, a multi-point measuring apparatus of FBG sensor (a reference numeral or the like of a constituent element will be added within ( ), as an example), according to the present embodiment, comprises: an optical fiber (4), which forms a diffraction grating on a first core; a light source (9), which is configured to emit lights; a first light modulator (10), which is configured to control time of a light entering into said optical fiber, among the lights being emitted from said light source; a second light modulator (12), which is configured to enter a light emitting from said first light modulator into said optical fiber, so as to control time during which a reflection light from the diffraction grating of said optical fiber penetrates through; a wavelength shift amount calculator (14), which is configured to separate a signal from said optical fiber through processing a signal, being obtained by detecting the reflection light from said second light modulator; a calculator (15), which is configured to calculate an amount of deformation of a target to be measured, from a result of said wavelength shift amount calculator; and a display portion (16), which is configured to display information relating to the amount of deformation of said target to be measured, being calculated by said calculator.

In more details thereof, within the multi-point measuring apparatus of FBG sensor, a light modulating means on side of the light source, for modulating the light from a wide-band wavelength light source and FBG sensors, each differing the reflection wavelength thereof a little bit, are formed in series, and there are provided a measuring means of an optical fiber, changing an optical path length from a measuring instrument to the FBG sensor, a detection-side light modulating means, for modulating the reflection light from the FBG sensor by a light modulator, a light detecting means for receiving only a light penetrating through this detection-side light modulator, a calculating means for converting the signal obtained by this light detecting means into wavelength, to separate the wavelength for each optical fiber, a converting means for converting the change of wavelength calculated by this calculating means into temperature or distortion of a target to be measured, a display means for displaying a result of this converting means, and an output means for outputting this information.

Detailed explanation will be given each embodiment, hereinafter, upon basis of the brief explanation of the embodiments according to the present invention mentioned above, by referring to the drawings. However, in all of the drawings for explaining the embodiments, principally, the same reference numerals are given to the same members, and therefore the repetitive explanations thereof will be omitted.

<Embodiment 1>

Explanation will be made on the multi-point measuring apparatus and the multi-point measuring method of FBG sensor, according to a first embodiment of the present invention, by referring to FIGS. 1 to 8.

<Structure of Multi-Point Measuring Apparatus of FBG Sensor>

First of all, explanation will be given to the structures of the multi-point measuring apparatus of FBG sensor, according to the present embodiment, by referring to FIG. 1. This is a view for showing an example of the structures of the multi-point measuring apparatus of FBG sensor.

The multi-pint measuring apparatus of FBG sensor according to the present embodiment is constructed with a measuring portion 1, a connector portion 2 and a controller portion 3. The measuring portion 1 is constructed with plural pieces of optical fibers 4 (4A, 4B and 4C), each forming multi-point (or multi-connection) FBG sensors 5 and delaying fibers 6 (in FIG. 1 is illustrated an example of three (3) pieces), and an optical fiber coupler 7.

The optical fiber 4A has the FBG sensors 5A-5G, being formed in series by plural numbers thereof (in FIG. 1 is illustrated an example of seven (7) pieces), with changing a pitch of the diffraction grating a little bit, so as to differ from in the reflection wavelength. In the similar manner, the optical fibers is 4B and 4C have the FBG sensors formed in series by plural numbers thereof, with changing the pitch of the diffraction grating a little bit, so as to differ from in the reflection wavelength.

Figure 2A:
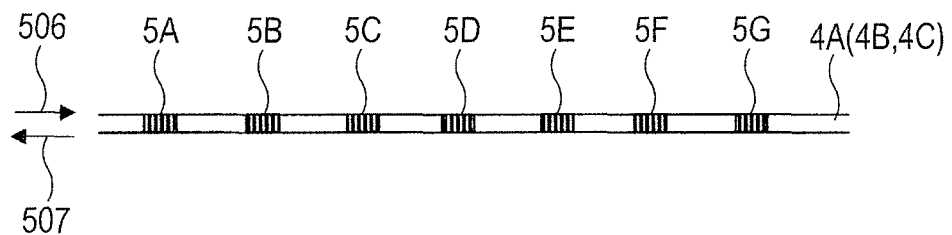
FIGS. 2A to 2C are views for explaining an example of a multi-point FBG sensor shown in FIG. 1.
Figure 2B:
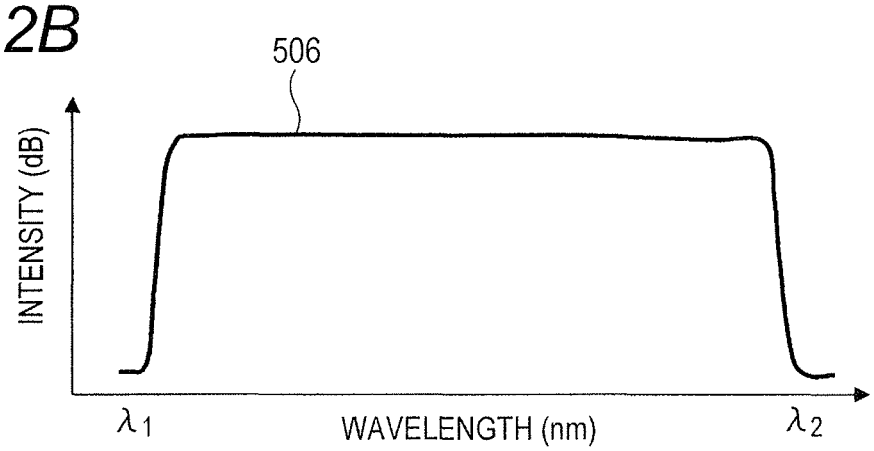
Figure 2C:
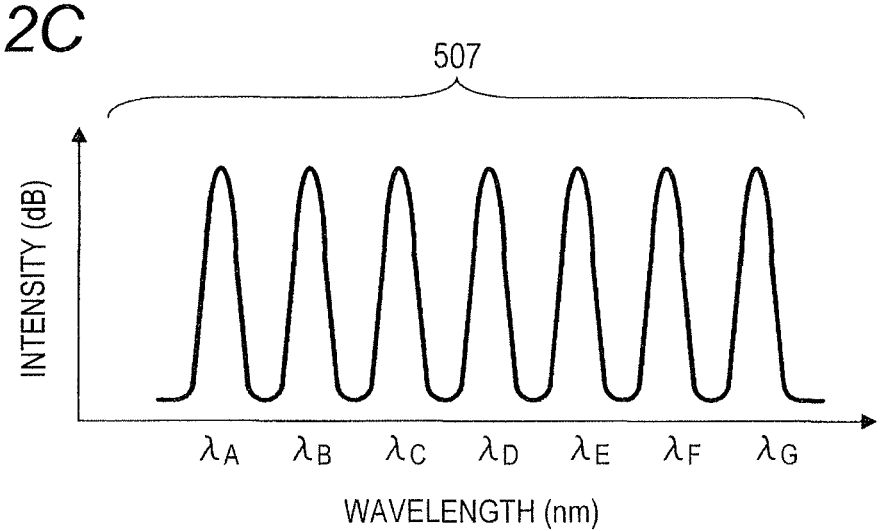

Herein, explanation will be made on the multi-point FBG sensor 5 mentioned above. FIGS. 2A to 2C are views for explaining an example of the multi-point FBG sensor. FIG. 2A shows a front view of the multi-point FBG sensor, FIG. 2B the wavelength characteristics of an optical signal, i.e., an input light 506, which is inputted into the FBG sensor, and FIG. 2C the wavelength characteristics of an optical signal, i.e., a reflection light 507, which is reflected on the FBG sensor 5 to be outputted, among optical signals inputted.

As is shown in FIG. 2A, the optical fiber 4 (for example, 4A (similar to 4B and 4C)) includes FBG sensors 5A-5G, being formed in series. On each of the FBG sensors from 5A to 5G are formed, as is shown in FIG. 13 mentioned before, the pitch "Λ" of the diffraction grating 505 is changed a little bit, so that the reflection wavelength changes a little bit. In FIG. 2B, the horizontal axis indicates the wavelength, while the vertical axis indicates the strength (or intensity) of the optical signal, i.e., the input light 506 into the FBG sensor, respectively. The optical signal inputted to the optical fiber 4A has the wavelength characteristics of multi-waves from wavelength "$\lambda_1$" to wavelength "$\lambda_2$". In FIG. 2C, the horizontal axis indicates the wavelength, while the vertical axis indicates the strength (or intensity) of the optical signal, i.e., the reflection light 507 from the FBG sensor, respectively.

The input light 506 reflects on each FBG sensor with the wavelength corresponding to the pitch "Λ" of the diffraction grating of each FBG sensor, so that the reflection light 507 is outputted. The wavelength is "$\lambda_A$" on the FBG sensor 5A, the wavelength "$\lambda_B$" on the FBG sensor 5B, the wavelength "$\lambda_C$" on the FBG sensor 5C, the wavelength "$\lambda_D$" on the FBG sensor 5D, the wavelength "$\lambda_E$" on the FBG sensor 5E, the wavelength "$\lambda_F$" on the FBG sensor 5F, and the wavelength "$\lambda_G$" on the FBG sensor 5G, respectively. In this manner, forming the plural numbers of FBG sensors 5A-5G, in series, on one (1) pieces of the optical fiber 4A, while changing the wavelength a little bit, enables to detect the change of wavelength, respectively, corresponding to each of them. However, it is impossible to specify the wavelength difference, for example, that between the wavelength "$\lambda_A$" and the wavelength "$\lambda_B$" neighboring with, from those of the changing FBG sensors 5A and 5B, if bringing the wavelength to be wider than the wavelength difference, which changes depending on the temperature or the distortion amount, as was mentioned before. Then, according to the present embodiment, such problem is dissolved, by using the plural pieces of optical fibers 4 (4A-4G), each forming the multi-point FBG sensors 5 (5A-5G) and the delaying fibers 6 (6A-6C), etc., as will be mentioned later.

Figure 3A:
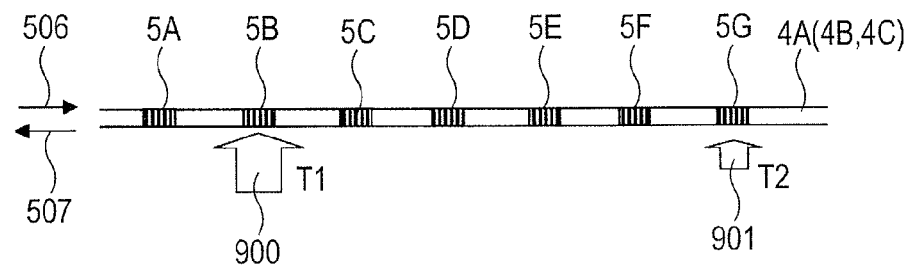
FIGS. 3A to 3C are views for explain an example of a multi-point FBG sensor shown in FIG. 1, before and during measurement therewith.
Figure 3B:
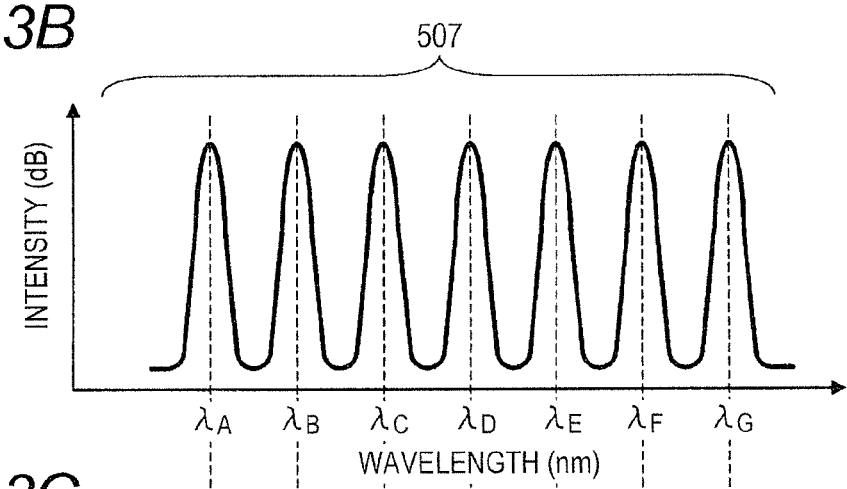
Figure 3C:
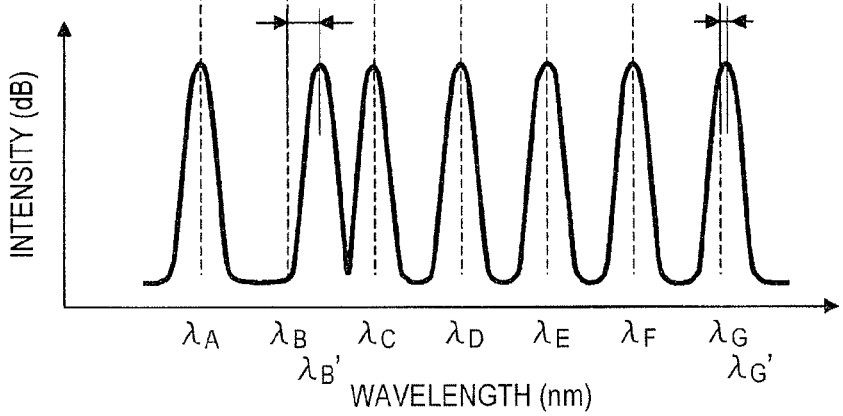

FIGS. 3A-3C are views for explaining an example of the operations of the multi-point FBG sensor 5, before measurement and during the measurement. FIG. 3A shows a front view of the multi-point FBG sensor 5, FIG. 3B the wavelength characteristics of the optical signal, i.e., the reflection light 507, being reflected on the FBG sensor 5 to be outputted, among the optical signals, which are inputted before the measurement (i.e., normal condition), and FIG. 3C the wavelength characteristics of the optical signal, i.e., the reflection light 507, being reflected on the FBG sensor 5 to be outputted, among the optical signals, which are inputted during the measurement (i.e., when the temperature or the distortion is generated in a part thereof), respectively.

In FIG. 3A, it is assumed that temperature 900 of "T1" is generated at the position of the FBG sensor 5B, and that temperature 901 of "T2" is generated at the position of the FBG sensor 5G, for example. FIG. 3 shows the reflection characteristics before the measurement, wherein the wavelength centers of those are within a range from "$\lambda_A$" to "$\lambda_B$".

During the measurement, the characteristics comes into such a result as shown in FIG. 3C; i.e., on the FBG sensor 5B where the change of temperature occurs, the wavelength "$\lambda_B$" changes to "$\lambda_B'$", while on the FBG sensor 5G where the change of temperature occurs, the wavelength "$\lambda_G$" changes to "$\lambda_G'$". On the other FBG sensors 5A, 5C, 5D, 5E and 5F, there is no change of the wavelength. At the temperature "T1", the change of wavelength is obtained, i.e., "wavelength $\lambda_B'$"–"wavelength $\lambda_B$", and it is divided by the temperature characteristics at 10 pm/° C., and thereby calculating an amount of temperature change (T1=$(\lambda_B'-\lambda_B)$/10 pm/° C.). An amount of temperature change (T2=$(\lambda_G'-\lambda_G)$/10 pm/° C.) at the temperature "T2" is also similar to that.

Turning back to FIG. 1 mentioned above, further explanation will be given about the multi-point measuring apparatus of FBG sensor according to the present embodiment. In this FIG. 1, on the optical fiber 4A, in particular, on the side of the controller portion 3 for the FBG sensors 5A-5G, which are formed in series, by seven (7) pieces thereof, so as to differ from in the reflection wavelength, there is provided the delaying fiber 6A having length of "L1". The optical fiber 4B has the FBG sensors 5A-5G, in the similar manner, and has the delaying fiber 6B having length of "L2". The optical fiber 4C has the FBG sensors 5A-5G, in the similar manner, and has the delaying fiber 6C having length of "L3". The length of the delaying fiber 6 is determined to be distinguishable between the optical fiber 4A and the optical fiber 4B, by taking the velocity of light in the optical fiber 4 into the consideration. Also, since the delay time comes to be equal to, if determining the difference to be equal in the length among those delaying fibers 6, then the processing thereof comes to be easy or simple. Of course, there is no problem if determining those lengths not to be equal to, as far as they are same in the length thereof.

With the present embodiment, explanation will be given when applying three (3) pieces of optical fibers 4 therein. However, it does not matter if those reflection wavelengths of the FBG sensors 5A-5G of the optical fiber 4 are same to, all, or different from. Also, the number of pieces of FBG sensors should not be limited to seven (7) pieces, and further the number of pieces of optical fiber 4 should not be limited to three (3) pieces.

The optical fiber coupler 7 of the measurement portion 1 is provided for distributing one (1) piece of the transmission path to plural numbers of the optical fibers 4; i.e., enabling to unify the optical fibers 4A, 4B and 4C into one (1) piece of transmission path by connecting them to the distributing side.

The connector portion 2 is a mechanism portion for connecting between the connector portion 2 and the controller portion 3, and is constructed with a joint 8, through which optical transmission can be made. The joint 8 is constructed with a rotating portion 8a and a fixing portion 8b. For example, when the measurement portion 1 is provided within the rotating body, the rotating portion 8a of the joint 8 is provided in such a manner that it can rotate together with the measurement portion, simultaneously. Of course, in case where the measurement portion 1 does not rotate, this joint may be not necessary to be connected in the structure thereof.

The controller portion 3 comprises a wide-band wavelength light source 9, a light-source side light modulator 10, an optical circulator 11, a detector side light modulator 12, a light receiving element 13, an accumulator portion 13A, a wavelength shift amount calculator 14, a temperature/distortion calculator 15, a display portion 16, an output portion 17, a measurement condition setup portion 18 and a light modulator controlling circuit 19.

The wide-band wavelength light source 9 is a light source for emitting lights therefrom. The light-source side light modulator 10 is a light modulator for light modulating the light emitted from the wide-band wavelength light source 9, to be the light, being controlled on the specific timing and the time thereof. The optical circulator 11 is a circulator, for entering the light emitted from the light-source side light modulator 10 into the optical fiber coupler 7, and also for guiding the reflection lights from respective optical fibers 4, which are composed within the optical fiber coupler 7, to the detector side light modulator 12.

The detector side light modulator 12 is a light modulator for modulating the light guided by the optical circulator 11, to be the light, being controlled by the timing and the time in synchronism with the timing and the time of the light-source side light modulator 10. The light receiving element 13 is a photoelectric converter element for converting the light received from the detector side light modulator 12 into an electric signal. The accumulator portion 13A is an accumulating means for accumulating the electric signals converted by the light receiving element 13.

The wavelength shift amount calculator 14 is a calculating means for dividing the signals, which are converted into the electric signals by the light receiving element 13 and accumulated in the accumulator portion 13A, into the wavelength for each of the optical fibers 4, so that they can be outputted to be the wavelengths corresponding to the FBS sensors 5 respectively. The temperature/distortion calculator 15 is a calculating means for calculating the temperature or an amount of the distortion from the shift amount of the wavelength, which is calculated within the wavelength shift amount calculator 14.

The display portion 16 is a displaying means for conducting display of a place where the measurement is made, a detected waveform, and display of a center of the waveform, etc., other than those of the distortion, a result of measurement of temperature, etc., after calculation within the temperature/distortion calculator 15. The output portion 17 is a means for outputting the screen, the result of measurement, the measuring condition, etc., being displayed on the display portion 16, onto an external memory or apaper, etc. The measurement condition setup portion 18 is a setting means, being connected with the display portion 16, the output portion 17 and the light modulator controlling circuit 19, etc., for setting up the conditions necessary for the measurement and the conditions for determining the result of measurement. The light modulator controlling circuit 19 is a controlling means for bringing the timing and the time to be in synchronism with, between the light-source side light modulator 10 and the detector side light modulator 12.

<Operation of Multi-Point Measuring Apparatus of FBG Sensor>

Next, explanation will be given on the operation of the multi-point measuring apparatus of FBR sensor having such the structures shown in FIG. 1 mentioned above.

First of all, the light from the wide-band wavelength light source 9 is modulated to be the optical signal within the light-source side light modulator 10, and the light passing through that is transmitted to the optical fiber coupler 7 through the optical circulator 11. As such wide-band wavelength light source 9 is applied one having a wide wavelength band, such as, an ASE (Amplified Spontaneous Emission) light source, for example. Or, it is possible to obtain the similar effect if applying a sweeping light source.

And, the reflection lights from the FBG sensors 5A-5G of the optical fibers 4A-4C, passing through the optical fiber coupler 7, again, turn back to the optical circulator 11, to be transmitted to the detector side light modulator 12. Further, the lights passing through the detector side light modulator 12 are received by the light receiving element 13, and the central wavelengths of the FBG sensors 5A-5G are calculated within the wavelength shift amount calculator 14, respectively. Further, in the temperature/distortion calculator 15 are calculated the temperatures/distortions of the FBG sensors 5A-5G of the optical fibers 4A-4C, and a result thereof is displayed on the display portion 16. Also, a desired result is outputted by the output portion 17.

In this instance, the light-source side light modulator 10 and the detector side light modulator 12 are controlled on an operation time and timing by the light modulator controlling circuit 19. Also, the measurement condition setup portion 18, inputting the conditions of the optical fibers 4A-4C and the measurement conditions, controls the light modulator controlling circuit 19, the display portion 16 and the output portion 17. Further, a spectroscope is used in the light receiving element 13, for enabling to measure the wavelength of light, when the ASE light source is applied as the wide-band wavelength light source 9. Or when applying the sweeping light source as the wide-band wavelength light source 9, there is used an element, such as, a photo diode, etc., for enabling to convert the optical output into an electric output.

Following to the above, explanation will be given on a relationship between the velocity of light within the optical fibers 4A-4C and delay times due to the lengths of the optical fibers 4A-4C. The following equation (Eq. 1) presents the velocity of light within the optical fibers 4A-4C.

Velocity of Light=Light Velocity in Vacuum/Refractive Index of Optical Fiber (Eq. 1)

Wherein, if the light velocity within the vacuum is 299, 792,458 m/s and the refractive index of the optical fibers 4A-4C is 1.45, then according to the (Eq. 1), the velocity of light within the optical fibers 4A-4C is 205,337,300 m/s.

Next, the delay time due to the lengths of the optical fibers 4A-4C is presented by the following equation (Eq. 2).

Delay Time=Length of Optical Fiber×2/Velocity of Light in Optical Fiber (Eq. 2)

Wherein, if the length of the optical fibers 4A-4C is 20 m, then according to the (Eq. 2), the delay time comes to 194.8 nm.

<Operation Timing of Light Modulator>

FIG. 4 is a view for explaining an example of the operation timing of the light modulator (i.e., the light-source side light modulator 10 and the detector side light modulator 12) in the present embodiment. Examples of signals of the light-source side light modulator 10 and the detector side light modulator 12 are shown. Herein, it is assumed that length of the delaying fiber 4A of the optical fiber 4A is 20 m, length of the delaying fiber 4B of the optical fiber 4B 40 m, and length of the delaying fiber 4C of the optical fiber 4C is 60 m, respectively. Further, it is assumed that total lengths of the FBG sensor 5 are same to all. The delay time with this delaying fiber 6A comes to 194.8 nm, and they are added to, respectively. This delay time of 194.8 nm is assumed to be time "T".

First of all, with the light modulator controlling circuit 19 is conducted a control by a signal 20, controlling the light-source side light modulator 10 to penetrate the light of the wide-band wavelength light source 9 therethrough, at time "T", and also to penetrate the light of the wide-band wavelength light source 9 therethrough, at the time "4T", again. Also, with the light modulator controlling circuit 19 is conducted a control by a signal 21, controlling the detector side light modulator 12 to penetrate the reflection light from the FBS sensor 5 at the time "T", three (3) times. This number of times of the modulations is equal to the number of pieces of the optical fibers 4, and within the present embodiment, since there are three (3) pieces of the optical fibers, then three (3) times of the control is made.

First of all, the delay time of the light passing through at timing 22, at first, comes to "T", the delay time of the light passing through at a next timing 23 comes to "2T", and the delay time of the light passing through a further next timing 24 comes to "3T", respectively. Thus, this delay time "T" is a time corresponding to the length of the delaying fiber, i.e., 20 m, and it can be said that at the timing 22 or 22a is detected the reflection light upon the optical fiber 4A, and in the similar manner, at the timing 23 or 23a is detected the reflection light upon the optical fiber 4B, and at the timing 24 or 24a is detected the reflection light upon the optical fiber 4C, respectively. In the light modulator controlling circuit 19 is made a setup according to the measurement condition, such as, the condition of the optical fibers 4 and the detection condition, etc., through the measurement condition setup portion 18. In this manner, calculating the reflection wavelength upon the FBG sensor 5, from the reflection lights depending on the delay times of each optical fiber 4, it is possible for each of the FBG sensors 5A-5G, which are formed on each of the optical fibers 4A-4C, to detect it without overlapping.

However, it is preferable to conduct the controls of the light-source side light modulator 10 and the detector side light modulator 12 at a time shorter than the delay time "T" a little bit, by taking the delay times of the modulators into the consideration thereof. Also, as the light-source side light modulator 10 and the detector side light modulator 12 may be applied such one, that can control the time for penetrating or shutting off the incident light by an order of "ns", for example, an AO element, an EO element, and a semiconductor optical amplifier, etc.

<Distribution of Intensity of Each Optical Fiber>

FIGS. 5A-5D are views for explaining an example of the distribution of detection intensity of each optical fiber 4 in the light receiving element 13, which is detected at the timing shown in FIG. 4 mentioned above. FIG. 5A shows an operation signal of the detector side light modulator 12, FIG. 5B the distribution of detection intensity on the optical fiber 4A, FIG. 5C the distribution of detection intensity on the optical fiber 4B, and FIG. 5D the distribution of detection intensity on the optical fiber 4C, respectively.

In FIG. 5A, the signal 21 of the detector side light modulator 12 is same to that shown in FIG. 4. Since detection signals of the light receiving element 13 are accumulated by means of the accumulator portion 13A, then it is possible to produce the distribution of intensity for each optical fiber, by composing the detection signal depending on the signal 21. In FIG. 5B, composing the signals at the timing 22 and the timing 22a of the signal 21 comes to signal intensity 25 on the optical fiber 4A. In the similar manner, composing the signals at the timing 23 and the timing 23a of the signal 21, in FIG. 5B, comes to signal intensity 26 on the optical fiber 4C. In FIG. 5D, composing the signals at the timing 24 and the timing 24a of the signal 21 comes to signal intensity 27 on the optical fiber 4C. In this manner, composing at each timing of the light receiving element, at the timing of the detector side light modulator 12, enables to produce the distribution of intensity of each of the optical fibers 4A-4C.

<Calculation of Wavelength of Detected Waveform>

Figure 6A:
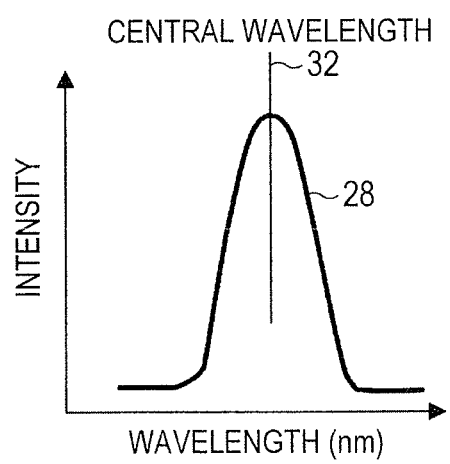
FIGS. 6A and 6B are views for showing an example of calculation of wavelength of a wave configuration, which is detected from the FBG sensor shown in FIG. 1.
Figure 6B:
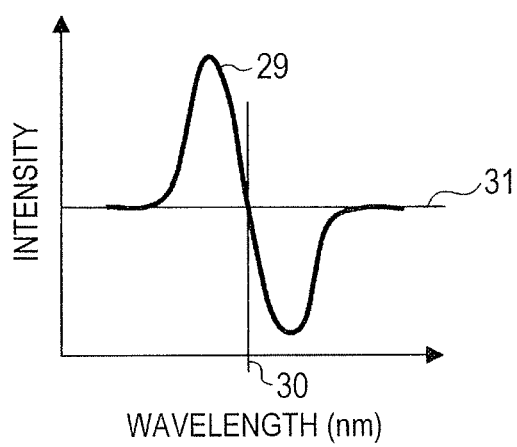

FIGS. 6A-6B are view for explaining an example of calculation of wavelength of a detected waveform, which is detected from the FBG sensor 5. FIG. 6A shows the distribution of intensity of the reflection light from the FBG sensor, which detected by the light receiving element 13, and FIG. 6B the distribution of intensity of the waveform, which is obtained by treating a differentiation process on the waveform shown in FIG. 6A.

In FIG. 6A, the horizontal axis presents the wavelength while the vertical axis presents a detection output (i.e., the intensity) of the reflection light, which is obtained by detecting the reflection light from the FBG sensor 5. The detected waveform of the reflection light from the FBG sensor, which is detected by the light receiving element 13 comes to a waveform 28. After treating the differential process thereon, the detected waveform 28 comes to a differential waveform 29. Calculating an intersection point of this differential waveform 29 with a base level 30, it is possible to calculate a center wavelength of the detected waveform 28. The calculation of the wavelength in the wavelength shift amount calculator 14 shown in FIG. 1, the calculation of wavelength can be executed by the method mentioned above. However, other method for obtaining the wavelength of the detected waveform 28 does not matter with. With obtaining an amount of movement or shifting of the wavelength on the FBG sensor at the measurement point from this center wavelength, the measurement is conducted at the measurement point.

<Display Screen on Display Portion>

Figure 7:
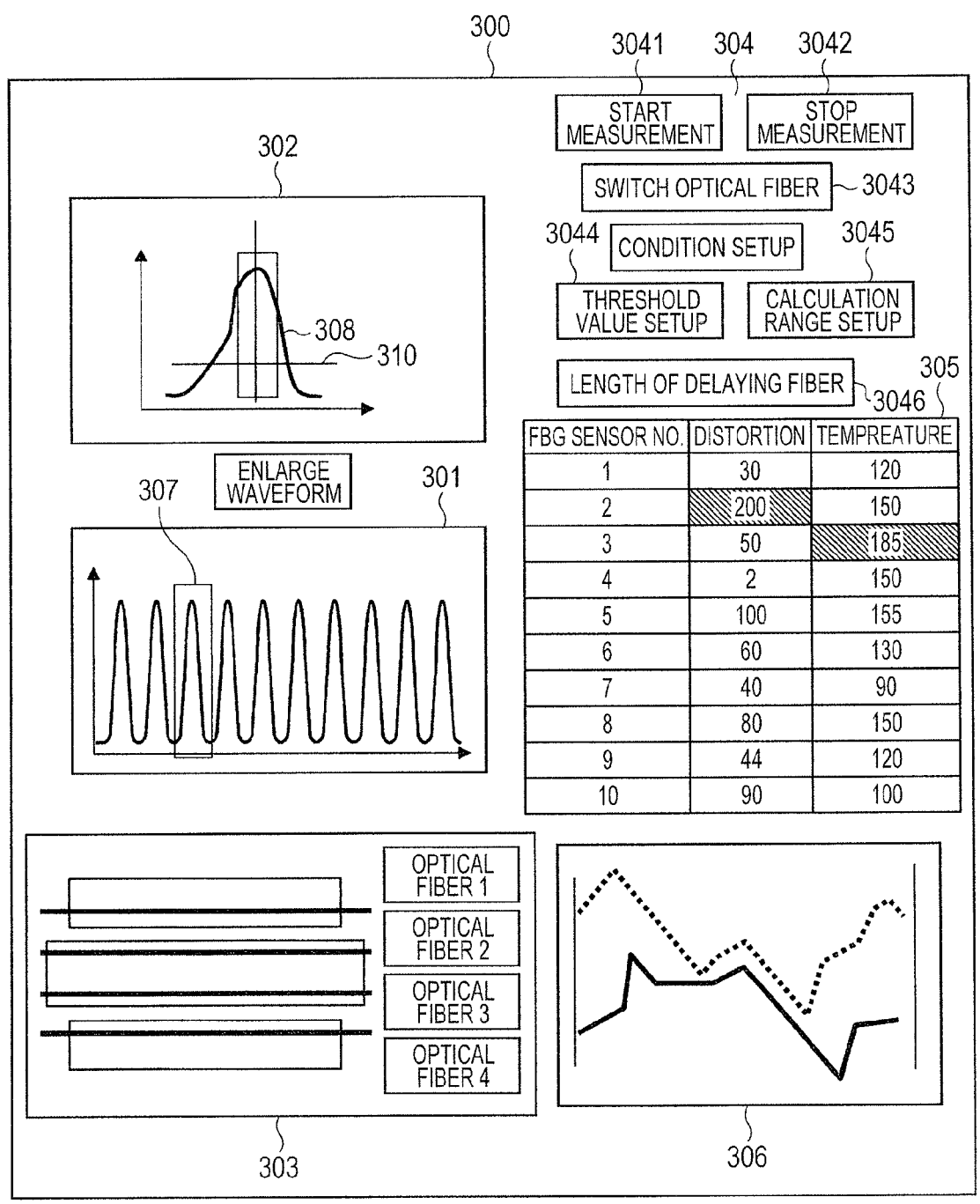
FIG. 7 is a view for explaining an example of a display screen on a display portion shown in FIG. 1.

FIG. 7 is a view for explaining an example of the display screen on the display portion 16. A display screen 300 comprises a total waveform display portion 301 for the FBG sensor 5, an enlarged display portion 302 for this total waveform display portion 301, a measuring position display portion 303, a condition setup portion 304, a measuring result display portion 305 and a measuring result graph display portion 306.

In the total waveform display portion 301, it is possible to select a waveform to be enlarged by a frame 307. In the enlarged display portion 302, the waveform in the frame 307, which is selected in the total waveform display portion 301, is enlarged. In this enlarged display portion 302, it is possible to determine the frame 308, and with using the waveform, being equal to or greater than is a threshold value 310 within this frame, the calculation is made on the wavelength in accordance with the method shown in FIGS. 6A and 6B.

In the measuring position display portion 303, it is possible to display the measuring position. However, in FIG. 7 is shown the example, in which the number of pieces of the optical fibers is four (4). In the condition setup portion 304, it is possible to determine a start of measurement 3041, a stop of measurement 3042, an exchange of optical fiber 3043, a setup 3044 of threshold value, i.e., the measurement condition, a setup of calculation region 3045 and a length of the delaying fiber 3046.

In the measuring result display portion 305, it is possible to display measurement results of the distortion and the temperature corresponding to the FBG sensor 5. However, in FIG. 7 is shown the example, in which the number of sets of the FBG sensors 5 is ten (10). In this example, the distortion of the FBG sensor of "No. 2" is large, and the temperature of the FBG sensor of "No. 3" is high. The measuring result graph display portion 306 is provided for displaying the measuring results of the distortion and the temperature, which are displayed in the measuring result display portion 305, after changing them into graphs thereof, time-sequentially.

<Measuring Flow of Multi-Point Measuring Apparatus with Using FBG Sensor>

Figure 8:
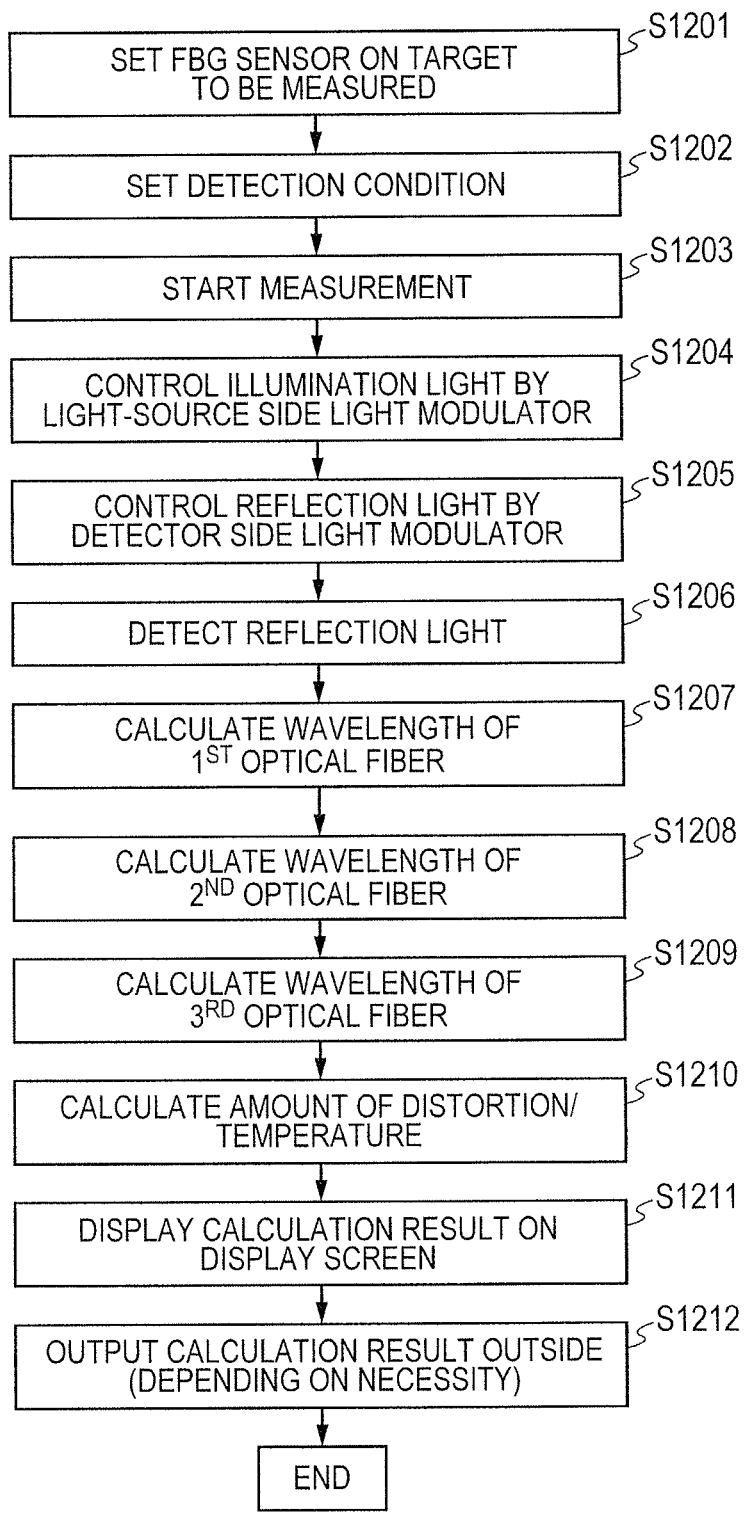
FIG. 8 is a flowchart view for explaining an example of a measuring flow of the multi-point measuring apparatus of FBG sensor, applying the FBG sensors therein, according to an embodiment 1 of the present invention.

FIG. 8 is a flowchart for explaining an example of a measuring flow of the multi-point measuring apparatus with using the FBG sensor, according to the present embodiment.

First of all, the FBG sensor (i.e., the optical fiber 4) is set on a target to be measured (S1201). Next, on the display screen 300 of the display portion 16 is made a setting of the detection condition, for measuring the target to be measured (S1202), and then the measurement is started (S1203).

When the measurement is started, hereinafter are executed programmed processes in accordance with software, automatically. First of all, an illuminating light is irradiated on the FBG sensor 5, and the reflection light thereof is controlled by the detector side light modulator 12 (S1205), so that the reflection light is detected upon the light receiving element 13 (S1206).

Further, within the wavelength shift amount calculator 14, the light wavelength from the first optical fiber is calculated (S1207), the light wavelength from the second optical fiber is calculated (S1208), and the light wavelength of the third optical fiber is calculated (S1209), one by one, and then the amount of distortion and the temperature are calculated by the temperature/distortion calculator 15 are calculated from the amounts of changes of the wavelengths (S1210).

And, those calculated results are displayed on the display screen 300 of the display portion 16 (S1211), and also the calculated results are outputted to an outside depending on the necessity thereof through the output portion 17 (S1212); then the measurement is ended.

<Effect(S) of Present Embodiment>

As was explained in the above, with the multi-point measuring apparatus and the multi-point measuring method of FBG sensor, according to the present embodiment, the following effect (s) can be obtained.

With the multi-point measuring apparatus of FBG sensor, having the optical fibers 4 (4A-4C), on the core of which is formed the diffraction grating, the wide-band wavelength light source 9, the light-source side light modulator 10 for controlling the time of the light incident upon the optical fiber 4, among the lights from that light source, the detector side light modulator 12, receiving the light emitting from that light modulator, for controlling the time of penetrating the reflection light from the diffraction grating of the optical fiber 4, the wavelength shift amount calculator 14 for separating the signal from the optical fiber through processing the signal, which is obtained by detecting the reflection light from that light modulator, the temperature/distortion calculator 15 for calculating the amount of deformation of the target to be measured from the result of that calculator, and the display portion for displaying the information relating to the amount of deformation of that target to be measured, etc., it is possible to make the measurement of the FBG sensor 5 of the plural pieces of the optical fibers 4, without using an optical switch therein, even under the condition of applying the plural pieces of the optical fibers 4 within one (1) piece of the transmission path. In other words, without exchanging the light signals from the plural pieces of the optical fibers 4 by the optical switch, it is possible to transmit them within one (1) piece of the transmission path, and further it is possible to detects the plural pieces of the optical fibers 4 by one (1) set of a measuring instrument. With this, it is possible to detect the temperature or the distortion due to the deformation of the target to be measured.

In more details thereof, it is possible to restrict the time, during when the light from the wide-band wavelength light source 9 enters into the each optical fiber 4, through controlling the penetrating time thereof by the light-source side light modulator 10. Also, by the detector side light modulator 12, it is possible to restrict the time, so that the reflection light from the diffraction grating of the each optical fiber 4 can penetrate therethrough only during the delay time, which is generated in each delaying fiber 6 of the each optical fiber 4. As a result of this, it is possible to separate the reflection lights from those optical fibers 4, respectively, time-sequentially.

Also, with the multi-point measuring method of FBG sensor, having steps of, modulating the light from the wide-band wavelength light source 9 (S1204), modulating the reflection lights from the diffraction gratings of the optical fibers 4 (4A-4C) by the detector side light modulator 12 (S1205), calculating the wavelength from the signal, which is obtained through the photoelectric conversion of the reflection light modulated by the detector side light modulator 12 (S1207-S1209), and measuring the deformation of the target to be measured by separating the signals from the optical fibers, respectively, time-sequentially (S1210), in the similar manner to that of the multi-point measuring apparatus mentioned above, it is possible to make the measurement of the FBG sensor 5 of the plural pieces of the optical fibers 4, without using an optical switch therein, even under the condition of applying the plural pieces of the optical fibers 4 within one (1) piece of the transmission path. In other words, without exchanging the light signals from the plural pieces of the optical fibers 4 by the optical switch, it is possible to transmit them within one (1) piece of the transmission path, and further it is possible to detects the plural pieces of the optical fibers 4 by one (1) set of a measuring instrument. With this, it is possible to detect the temperature or the distortion due to the deformation of the target to be measured.

<Embodiment 2>

Next, explanation will be given on examples of applying therein the multi-point measuring apparatus and the multi-point measuring method of FBG sensor according to the embodiment 1 mentioned above, in the order of the present embodiment 2, and then embodiments 3-5, which will be mentioned later, as well.

In the present embodiment, explanation will be given on the case where the multi-point measuring apparatus and the multi-point measuring method of FBG sensor are applied into measurement of a rotor of a power generator, as a first example of application thereof.

Figure 9:
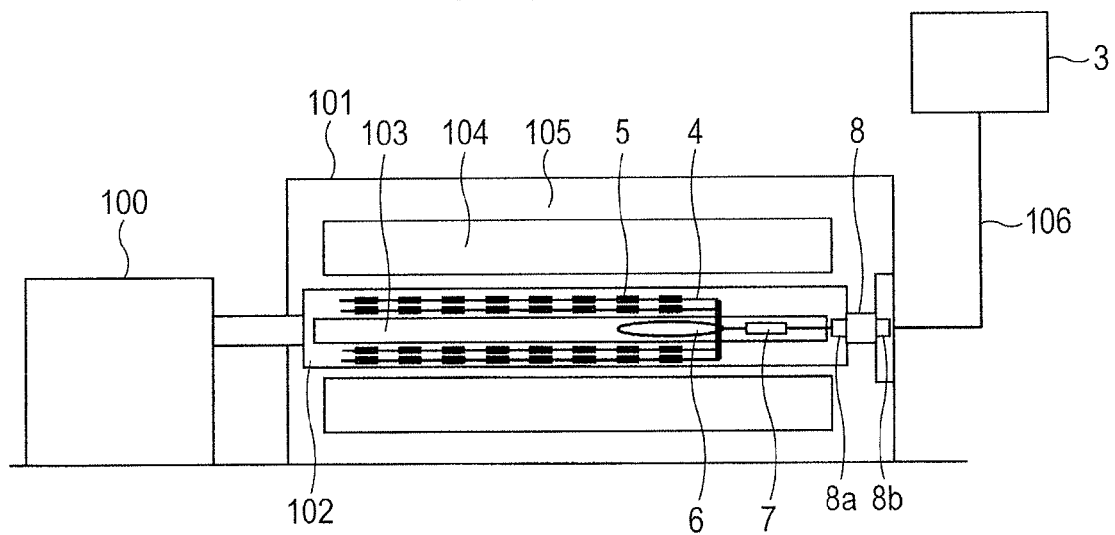
FIG. 9 is an outlook cross-section view for explaining an example of a power generator, as a first example of applying the multi-point measuring apparatus and the multi-point measuring method in the embodiment 1 (measurement of a rotor of the power generator), according to an embodiment 2 of the present invention.

FIG. 9 is an outlook cross-section view for explaining an example of the power generator. The power generator 101 is conducted with a rotor 102, a stator 104, and a housing 105, etc. A turbine 100 is connected with the rotor 102 of the power generator 101. The rotor 102 has a hollow structure 103 at the center thereof. The stator 104 is disposed so that it opposes to the rotor 102. On the rotor 102 and the stator 104 are winded up coils manufactured from a conductor (for example, a copper wire), respectively, through a method, but not shown in the figure.

On the rotor 102, i.e., a rotating body, is fixed the optical fiber 4 having the plural pieces of FBG sensors 5, which was explained in the embodiment 1, while the delaying fiber 6 and the optical fiber coupler 7 are provided in a part of the hollow structure 103 of the rotor 102. The rotating portion 8*a* of the joint 8 is fixed on the rotor 102, while the fixing portion 8*b* thereof is fixed on the housing 105, so that the optical fiber 4 can rotate with the rotor 102, simultaneously, in the structure thereof. The fixing portion 8*b* of the joint 8 is connected with the controller portion 3 through a connecting optical fiber 106.

The structures and the functions of the FBG sensor 5, the delaying fiber 6, the optical fiber coupler 7, the joint 8 and the controller portion 3 are similar to those explained in the embodiment 1 mentioned above; i.e., the temperature and the distortion are calculated out along such flow as explained in FIG. 8. Further, as was explained by referring to FIGS. 2A to 2C, if applying plural numbers of the FBG sensors 5 to one (1) piece of the optical fiber 4, it is possible to make measurement at a large number of points (i.e., the multi-points) on the rotor 102.

As is in the present embodiment, i.e., applying the multi-point measuring apparatus and the multi-point measuring method of FBG sensor into the rotor 102 of the power generator 101 enables to measure the distortion and the temperature within an inside of the power generator, while operating it, when testing the power generator 101 or during when the steady operation thereof. Further, the measurement is made with using the optical fiber, i.e., almost no ill influence can be considered due to the magnetic field, and then there is no change of deteriorating performances of the power generator 101.

<Embodiment 3>

Next, in the present embodiment, explanation will be given on the case of applying the multi-point measuring apparatus and the multi-point measuring method with using the FBG sensor into the measurement of the stator of the power generator, as a second example of application.

Figure 10:
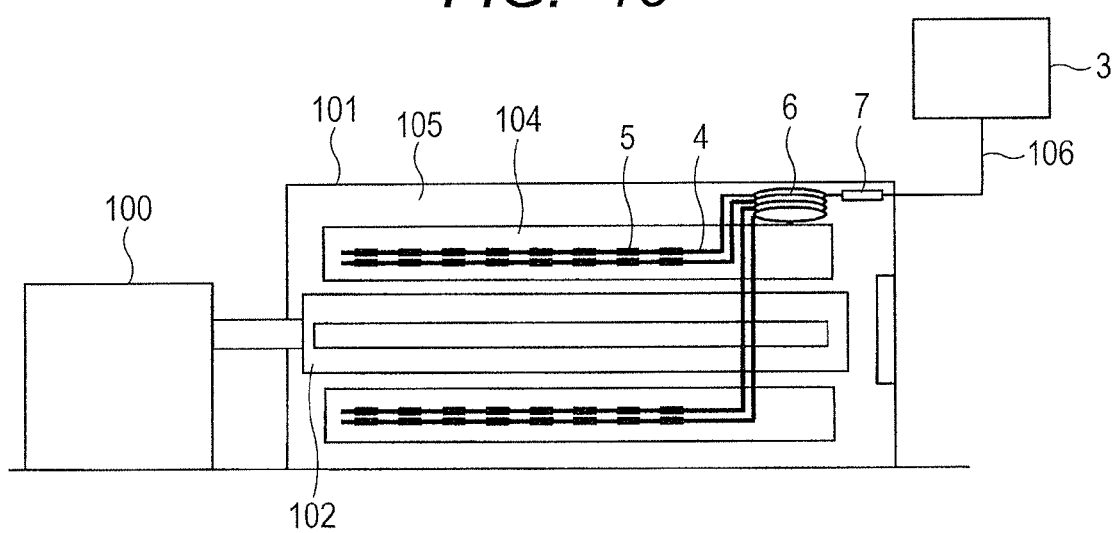
FIG. 10 is an outlook cross-section view for explaining an example of a power generator, as a second example of applying the multi-point measuring apparatus and the multi-point measuring method in the embodiment 1 (measurement of a stator of the power generator), according to an embodiment 3 of the present invention.

FIG. 10 is an outlook cross-section view for explaining an example of the power generator. The power generator 101 has the structure similar to that shown in FIG. 9 mentioned above. On the stator 104, i.e., a rest system, there is fixed the optical fiber 4, having plural numbers of FBG sensors 5, which was explained in the embodiment 1 mentioned above. Since the stator 104 is the rest system, there is no need of the joint 8, and then connection is made by a connecting optical fiber 106, directly, from the optical fiber coupler 7 to the controller portion 3, through the delaying fiber 6.

The structures and the functions of the FBG sensor 5, the delaying fiber 6, the optical fiber coupler 7 and the controller portion 3 are similar to those explained in the embodiment 1 mentioned above; i.e., the temperature and the distortion are calculated out along such flow as explained in FIG. 8. Further, as was explained by referring to FIGS. 2A to 2C, if applying plural numbers of the FBG sensors 5 to one (1) piece of the optical fiber 4, it is possible to make measurement at a large number of points (i.e., the multi-points) on the stator 104.

As is in the present embodiment, i.e., applying the multi-point measuring apparatus and the multi-point measuring method of FBG sensor into the stator 104 of the power generator 101, it is possible to measure the distortion and the temperature within an inside of the power generator, while operating it, when testing the power generator 101 or during when the steady operation thereof. Further, the measurement is made with using the optical fiber, i.e., almost no ill influence can be considered due to the magnetic field, and then there is no change of deteriorating performances of the power generator 101.

<Embodiment 4>

Next, in the present embodiment, explanation will be given on the case of applying the multi-point measuring apparatus and the multi-point measuring method with using the FBG sensor into the measurement of both the stator and the rotor of the power generator, as a third example of application.

Figure 11:
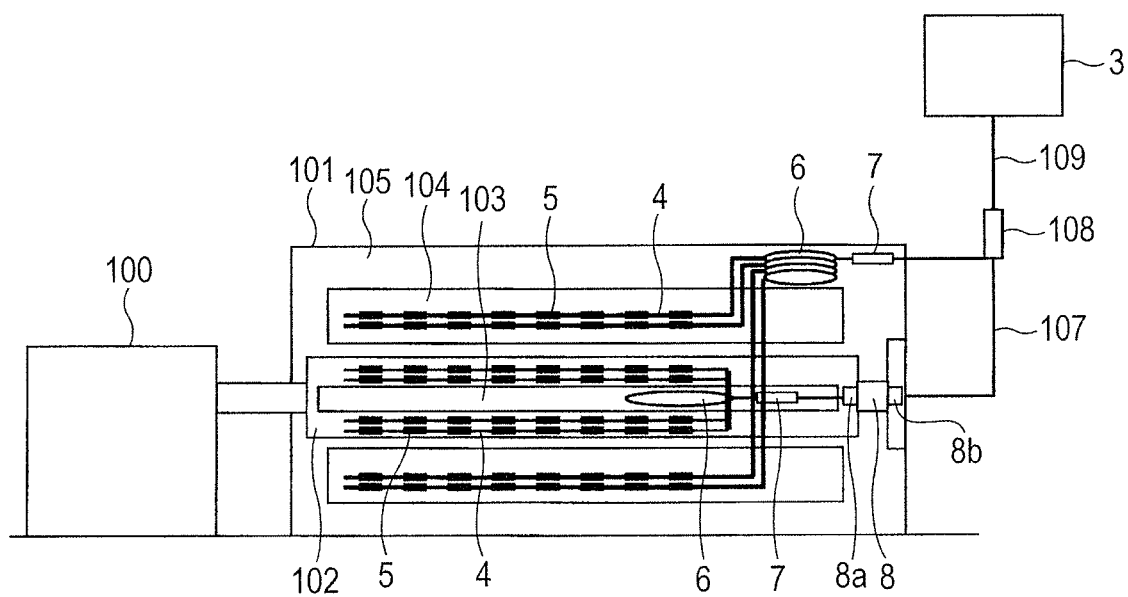
FIG. 11 is an outlook cross-section view for explaining an example of a power generator, as a third example of applying the multi-point measuring apparatus and the multi-point measuring method in the embodiment 1 (measurement of both, a rotor and a stator of the power generator), according to an embodiment 4 of the present invention.

FIG. 11 is an outlook cross-section view for explaining an example of the power generator. The power generator 101 has the structure similar to that shown in FIG. 9 or FIG. 10 mentioned above. First of all, on the rotor 102, the optical fiber 4 having plural numbers of FBG sensors, which was explained in FIG. 10, is connected to the optical fiber coupler 7. Further, the connecting optical fiber 107 from the joint 8 of the rotor 102 is connected to the optical fiber coupler 108. An output of the optical fiber coupler 7 on the side of the stator 104 is connected to the optical fiber coupler 108. And an output of the optical fiber coupler 108 is connected to the controller portion 3 through the connecting optical fiber 109.

The structures and the functions of the FBG sensor 5, the delaying fiber 6, the optical fiber coupler 7 and the controller portion 3 are similar to those explained in the embodiment 1 mentioned above; i.e., the temperature and the distortion are calculated out along such flow as explained in FIG. 8. Further, as was explained by referring to FIGS. 2A to 2C, if applying plural numbers of the FBG sensors 5 to one (1) piece of the optical fiber 4, it is possible to make measurement at a large number of points (i.e., the multi-points) on the rotor 102 and the stator 104.

As is in the present embodiment, i.e., applying the multi-point measuring apparatus and the multi-point measuring method of FBG sensor into the rotor 102 and the stator 104 of the power generator 101, it is possible to measure the distortion and the temperature within an inside of the power generator, while operating it, when testing the power generator 101 or during when the steady operation thereof. Further, the measurement is made with using the optical fiber, i.e., almost no ill influence can be considered due to the magnetic field, and then there is no change of deteriorating performances of the power generator 101.

<Embodiment 5>

Next, in the present embodiment, explanation will be given on the case of applying the multi-point measuring apparatus and the multi-point measuring method with using the FBG sensor into an atomic power generating facility, as a fourth example of application.

Figure 12:
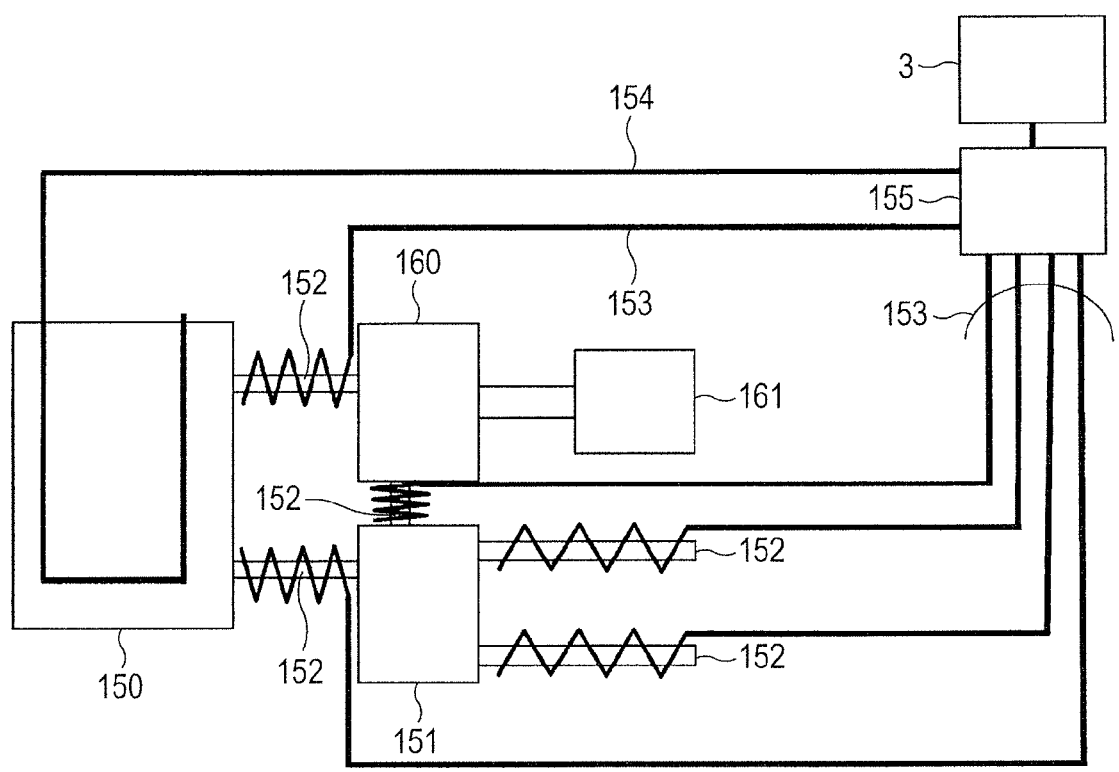
FIG. 12 is an outlook cross-section view for explaining an example of an atomic power generating facility, as a fourth example of applying the multi-point measuring apparatus and the multi-point measuring method in the embodiment 1 (the atomic power generating facility), according to an embodiment 5 of the present invention.
Figure 13C:
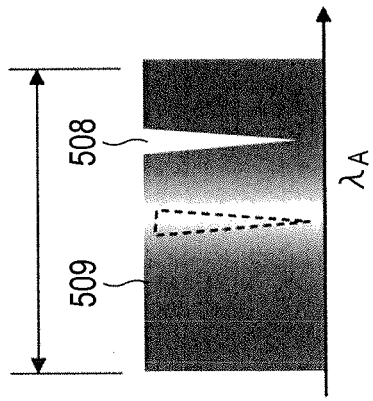
FIGS. 13A to 13D are views for explaining an principle of a general FBG sensor.
Figure 13B:
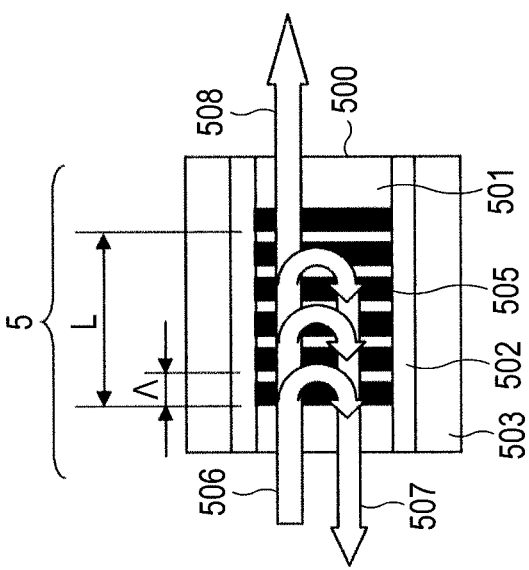
Figure 13A:
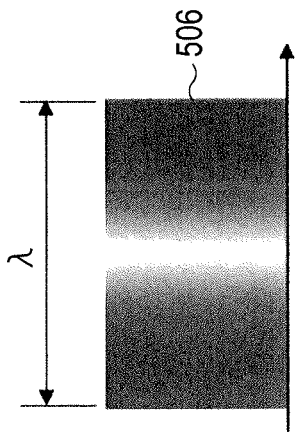
Figure 13D:
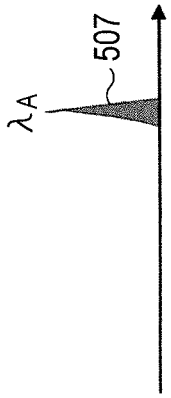

FIG. 12 is an outlook cross-section view for explaining an example of the atomic power generating facility. The atomic power generating facility has a nuclear reactor 150, a cooling apparatus 151, a turbine 160 and a power generator 161, etc. The turbine 160 is rotated by the nuclear reactor 150, and an electric power is generated by the power generator 161, which is connected with the turbine 160. The nuclear reactor 150, the turbine 160 and the cooling apparatus 151 are connected with each other, respectively, through cooling pipes 152.

Optical fibers 153, each having plural numbers FBG sensors 5 for use of measuring the cooling pipe, is wound round on the circumferences of the cooling pipes 152. An optical fiber 154 having plural numbers of FBG sensors 5 for use of measurement of the facility is stretched around the periphery of a building of the nuclear reactor 150, and similarly, it is fixed at portions of the FBG sensors 5 thereof. The optical fibers 153 and 154, each having the FBG sensors, respectively, are connected with the optical fiber coupler 155 to be connected to the controller portion 3.

The structures and the functions of the FBG sensor 5, the optical fiber coupler 7 and the controller portion 3 are similar to those explained in the embodiment 1 mentioned above; i.e., the temperature and the distortion are calculated out along such flow as explained in FIG. 8. Further, as was explained by referring to FIGS. 9 to 11, if applying fibers, each having plural numbers of the FBG sensors 5, as the optical fibers 153 for use of measurement of the cooling pipes and the optical fiber 154 for use of measurement of the facility, it is possible to make an observation at a large number of points (i.e., the multi-points), simultaneously.

As is in the present embodiment, i.e., applying the multi-point measuring apparatus and the multi-point measuring method of FBG sensor into the atomic power generating facility, it is possible to measure a deformation of the building of the nuclear reactor 150 and/or an abnormal increase of temperature thereof, an abnormal increase of temperature a health monitor and/or the cooling pipes 152 and/or an abnormal distortion thereof, etc., and therefore there can be also achieved an effect of enabling a safety monitor on the entire of the facility.

As was explained in the above, the details thereof, upon basis of the embodiment of the invention, which is accomplished by the present inventors; however, the present invention should not be restricted to the embodiments mentioned above, and it is needless to say that various variations can be made within a range of not deviating from a gist thereof.

The multi-point measuring technology of FBG sensor, according to the present invention, is applicable into the multi-point measuring method and the apparatus of FBG sensor, comprising plural pieces of the optical fibers, each inserting plural numbers of FBG sensor, upon which the wavelength of the reflection is changed, in series, and enabling detection without exchange of the fiber optical paths, through multiplication with the time division. For example, it is applicable into the rotor and/or the stator of the power generator, the atomic power generating facility, etc.

What is claimed is:

1. A multi-point measuring method of FBG sensor, having a first optical fiber, forming a diffraction grating on a first core and comprising a first delaying fiber having a first delay time, and a second optical fiber forming a diffraction grating on a second core and comprising a second delaying fiber having a second delay time, comprising the following steps of:
    modulating a light from a light source within a first light modulator;
    entering the light, which is modulated within said first light modulator, into said first optical fiber and said second optical fiber;
    modulating reflection lights from the diffraction grating of said first optical fiber and the diffraction grating of said second optical fiber within a second light modulator;
    conducting photoelectric conversion on the reflection lights, which are modulated within said second light modulator within a photoelectric converter element; and
    calculating a wavelength from the signal, which is obtained through the photoelectric conversion by said photoelectric converter element, and separating the signal from said first optical fiber from the signal from said second optical fiber, in a time-sequential manner, thereby to measure deformation of a target to be measured.

2. The multi-point measuring method of FBG sensor, as described in the claim 1, further having the following steps of:
    controlling time, during which the light from said light source penetrates through, by said first light modulator, so as to restrict time, during which the light enters into said first optical fiber and said second optical fiber; and
    restricting the reflection lights from the diffraction grating of said first optical fiber and the diffraction grating of said second optical fiber by said second light modulator, in such a manner that the light penetrates through during only delay time, which is generated in said delaying fiber of said first optical fiber, and that the light penetrates through during only delay time, which is generated in said delaying fiber of said second optical fiber, and thereby separating the reflection light from said first optical fiber from the reflection light from said second optical fiber, in the time-sequential manner.

3. The multi-point measuring method of FBG sensor, as described in the claim 1, wherein
    said first optical fiber and said second optical fiber are formed by inserting a FBG sensor, which changes a reflection wavelength of a light incident thereon due to the deformation of said target to be measured, respectively.

4. The multi-point measuring method of FBG sensor, as described in the claim 1, wherein
   at least two (2) or more pieces of optical fibers are provided, including said first optical fiber and said second optical fiber, and the signals from said two (2) or more pieces of optical fibers are separated from, in the time-sequential manner.

5. The multi-point measuring method of FBG sensor, as described in the claim 1, wherein
   measurement is made on temperature or distortion of said target to be measured as the deformation thereof.

* * * * *